April 22, 1924.
S. A. THRELKELD
1,491,762
RUNNING GEAR FOR VEHICLES
Filed Dec. 24, 1921
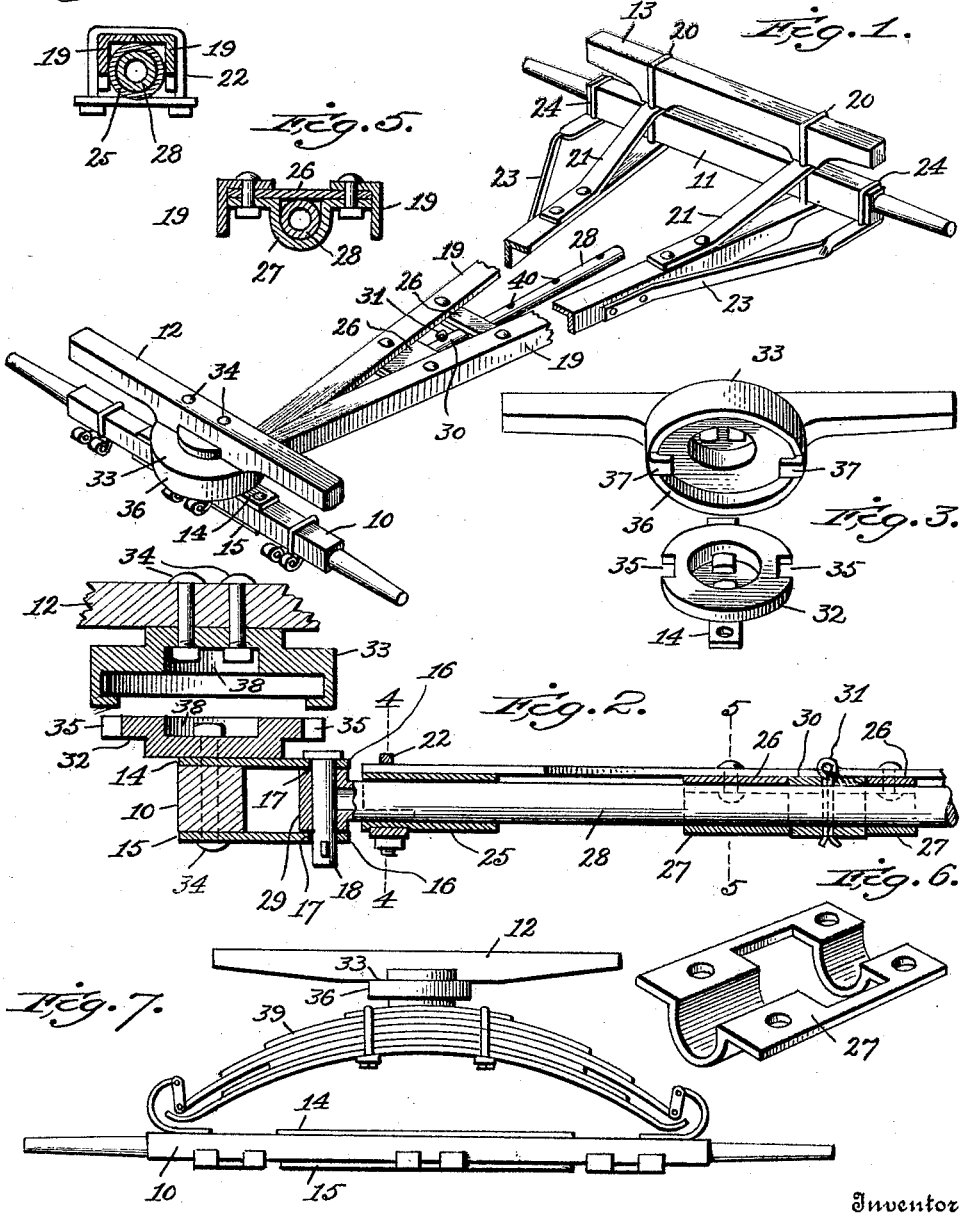
Inventor
Stephen Arthur Threlkeld
Witness
Edwin L. Yewell
By Davis & Davis
Attorneys Patented Apr. 22, 1924.

1,491,762

UNITED STATES PATENT OFFICE.

STEPHEN ARTHUR THRELKELD, OF HUTCHINSON, KANSAS, ASSIGNOR OF ONE-TENTH TO CHARLES R. THRELKELD, OF NICKERSON, KANSAS; ONE-TENTH TO ARTHUR W. THRELKELD, OF PINE RIVER, MINNESOTA; ONE-TENTH TO ROSCO S. THRELKELD, OF CRESTON, IOWA; ONE-TENTH TO MARY A. WILLIAMSON, OF CHARITON, IOWA; AND ONE-TENTH TO LORA B. PARROTT, OF GRINNELL, IOWA.

RUNNING GEAR FOR VEHICLES.

Application filed December 24, 1921. Serial No. 524,615.

*To all whom it may concern:*

Be it known that I, STEPHEN ARTHUR THRELKELD, a citizen of the United States of America, and a resident of Hutchinson, county of Reno, and State of Kansas, have invented certain new and useful Improvements in Running Gears for Vehicles, of which the following is a full and clear specification.

This invention relates to improvements in running-gears for vehicles, especially the type used on wagons, and has for its particular object to provide a running-gear having a few parts that are simple in construction and which will prevent undue wear and looseness, avoid the use of front hounds, lower the center of gravity of the vehicle, and permit the use of springs without appreciably raising the height of the bed level.

These and other objects are attained by the means illustrated in the accompanying drawing, in which—

Fig. 1 is a perspective view of the improved running-gear;

Fig. 2 is a longitudinal vertical sectional view through the front axle and its pivotal connections;

Fig. 3 is a detail perspective view of the two members forming the fifth-wheel;

Fig. 4 is a cross-sectional view on the line 4—4 of Fig. 2;

Fig. 5 is a similar view on the line 5—5 of Fig. 2;

Fig. 6 is a detail view of a supporting bracket for the coupling-pole; and

Fig. 7 is a view showing the front-axle having a spring-support for the wagon-bed.

The improved gear embodies the usual front-axle 10, rear-axle 11, and the front and rear bolsters 12 and 13 respectively.

To the top and bottom sides of the front-axle, midway between its ends, are rigidly secured the supporting-plates 14 and 15 which preferably extend a considerable distance upon the body of the axle and are formed with extensions 16 that project rearwardly from the axle and are provided with alined apertures 17 to receive the king-bolts 18.

Secured rigidly to and extending forwardly from the rear-axle are the hounds 19, their rear-ends being secured to the underside of the rear-axle by the U-bolts 20 which also engage over the rear-bolster and engage through top-straps 21 whose rear-ends extend between the rear-bolster and axle, the front-ends of these straps 21 extending forwardly a considerable distance and being rigidly connected upon the top-side of the hounds 19, as clearly shown in Fig. 1 of the drawing.

The rear-ends of the hounds 19 are spaced apart a considerable distance, while the front-ends are clamped together in close relation by the U-bolt 22, thus forming a V-shaped frame which is additionally connected to the rear-axle by the side-straps 23 that engage and are supported to the underside of the axle by the U-bolts 24 at the outer ends thereof.

Between the front ends of the hounds is clamped a collar or sleeve 25, and at a point near midway of the length of the hound are secured the bearing-plates 26 which, together with the double-cap 27, forms a doube bearing for the rear end of a coupling-pole 28, said coupling-pole being also supported adjacent its front-end by the sleeve 25 and being provided at its front-end with a T-head 29 which has a vertical opening therethrough to receive the king-bolt 18 to retain it between the supporting-plates 16 and in pivoted relation thereto.

The coupling-pole is mounted to rotate in the sleeve 25 and bearings 26—27. Endwise movement thereof is prevented by the stop-collar 30 which is mounted upon the coupling-pole at a point between the bearings 26—27 and secured in position by a pin 31 that passes through the lock-collar and the coupling-pole. From the above description, it will be seen that the front and rear portions of the running-gear are pivoted together for horizontal movement at a point to the rear of the front-axle and in alinement therewith; also that they are rotatably mounted with respect to each other on a horizontal axis so that the axles may tilt independently of each other.

To permit the front-axle to turn on its king-bolt independently of the front-bolster, a fifth-wheel is provided which comprises a bottom turn-plate 32 and a top turn-plate 33 which are rigidly secured by bolts 34, respectively, to the front-axle and bolster. The bottom turn-plate is formed with notches 35 at its front and rear sides, and top turn-plate 33 is formed with an annular skirt 36 having inwardly-projecting lugs 37 on its lower edge which are positioned at right-angles to the notches 35 when the bolster and axle lie in parallel relation to each other, these lugs 37 being adapted to be passed through the notches 35 and then turned to engage under the flange of the lower turn-plate to lock the parts in rotatable engagement with each other. Both the top and bottom turn-plates are formed with central recesses 38 which are adapted to receive the nuts of the securing-bolts 34 and also to form a pocket to receive a lubricant for the pivoted plates. It will be observed that the skirt 36 extends entirely around the bottom-plate, thereby forming a cover to prevent dirt or dust from entering between the faces of the plates.

When a spring 39 is used on the axle (as shown in Fig. 7), the turn-table or fifth-wheel is mounted on the top-side of the spring and secured thereon in any desirable manner, and where the type of spring used is secured to the outer ends of the axle, as shown, the load is carried near the hubs, thereby eliminating strain on the center of the axle.

The coupling-pole 28 is provided with a series of apertures 40 to permit the longitudinal adjustment of the pole to lengthen or shorten the running-gear as desired.

As shown in the drawing, the hounds 19 are formed with angle-irons, but it is understood that it is not desired to limit the construction of any of the parts to any particular metal or material.

What I claim is:

A running-gear comprising front and rear axles, a coupling-pole pivoted for horizontal movement to the front axle adjacent to its rear side and whose rear end terminates short of said rear axle, a pair of hounds forming a V-shaped frame and having their rear ends secured rigidly to the rear axle and their front ends provided with a bearing to permit a rotary movement on said coupling-pole, a double bearing for the coupling-pole on said frame intermediate its ends, and an adjustable collar on the coupling-pole located between the bearings of said double bearing and provided with means for locking it to said pole.

In testimony whereof I hereunto affix my signature.

STEPHEN ARTHUR THRELKELD.